G. CROSBY.
ELECTRICAL SYSTEM OF DISTRIBUTION.
APPLICATION FILED JUNE 26, 1914.

1,214,280.

Patented Jan. 30, 1917.

WITNESSES
Emil Seges
Adam Schmidt

INVENTOR
Gorham Crosby
BY
Kenyon & Kenyon
ATTORNEYS

UNITED STATES PATENT OFFICE.

GORHAM CROSBY, OF BROOKLYN, NEW YORK, ASSIGNOR TO GOULD COUPLER COMPANY, A CORPORATION OF NEW YORK.

ELECTRICAL SYSTEM OF DISTRIBUTION.

1,214,280.  Specification of Letters Patent.  Patented Jan. 30, 1917.

Application filed June 26, 1914. Serial No. 847,408.

*To all whom it may concern:*

Be it known that I, GORHAM CROSBY, a citizen of the United States, and a resident of Brooklyn, county of Kings, State of New York, have invented certain new and useful Improvements in Electrical Systems of Distribution, of which the following is a specification.

My invention relates to electrical systems of distribution and more particularly the regulation of variable speed generators, adapted to charge a storage battery, as in car lighting systems, where the generator is driven at a variable speed from one of the axles of the car. It has been heretofore suggested to control the voltage of such a generator by varying the strength of its field by means of the carbon pile in the field circuit of the generator, controlled either by a voltage coil or a current coil, or both, but according to my invention, I apply both current and voltage control not only entirely independent of one another, but by means of members acting on the same end of the pile, so that the pile is not shiftable or movable as a whole.

Further objects, features and advantages will more clearly appear from the detail description given below, taken in connection with the accompanying sheet of drawings, which form a part of this specification.

Figure 1:
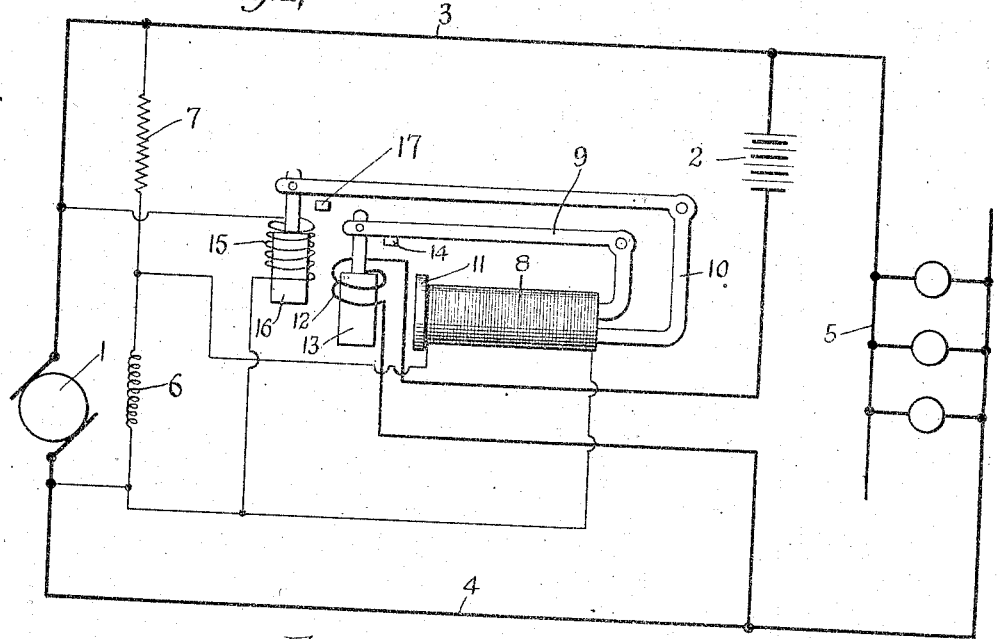
Figure 2:
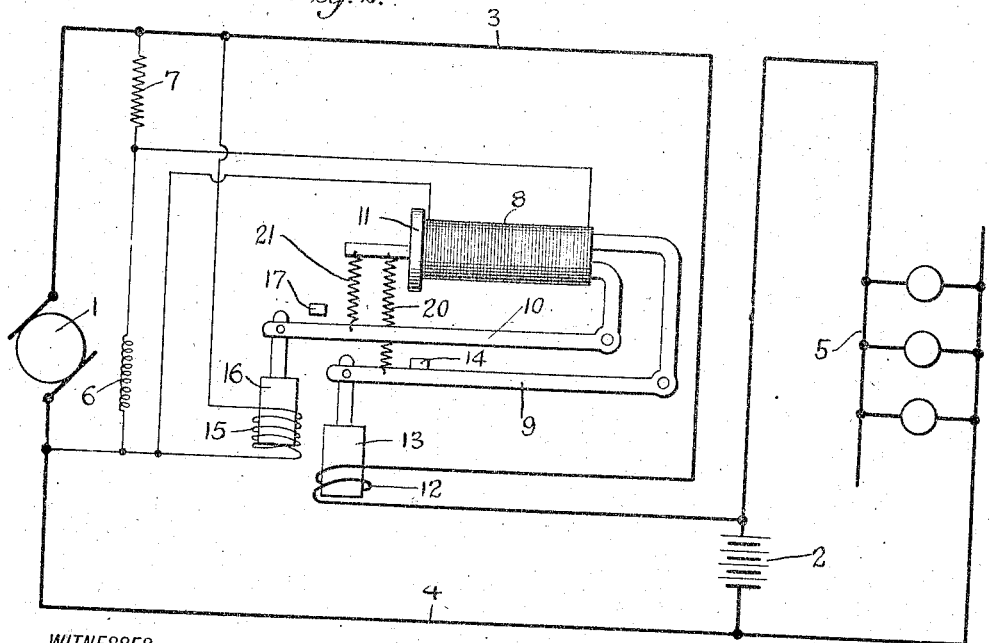

In the drawings, Figure 1 represents diagrammatically a system embodying my invention in one form, and Fig. 2 is a diagram embodying a modified form of the invention.

Referring to Fig. 1, 1 represents a main generator adapted to be driven at variable speed, as from the axle of a railway car. 2 represents a storage battery connected to the generator as by mains 3 and 4. 5 represents a lamp or translation circuit, also connected to be supplied by the generator when it is running at sufficient speed. 6 represents the field windings of the generator connected across the terminals of the generator in series with a fixed resistance 7. Connected in shunt with the field winding 6 is a carbon pile 8, having two levers 9 and 10, operating upon the same end of the pile. The other end of the pile is fixed, as by abutting against a fixed frame piece 11.

The lever 9 is operated by a solenoid 12, connected in series with the battery 2, in the battery circuit. The core 13 of the solenoid 12 normally pulls the lever 9 down against its stop 14. The lever 10 is operated by a solenoid 15, connected across the terminals to the generator, so as to be responsive to the voltage changes across the generator and battery. The core 16 of the solenoid 15 normally pulls the lever 10 down against its stop 17.

In operation, when the generator is not running, or not running at sufficient speed to generate a sufficient voltage to charge the battery, both of the cores 13 and 16 pull their respective levers 9 and 10 down against the stops 14 and 17, respectively, so as to relieve the pressure on the pile 8, whereby the resistance of the pile 8 is very great, or the pile is substantially open circuited, and accordingly shunts little or no current away from the fields 6. When, however, the generator voltage is built up sufficient to charge the battery with the desired charging current, the current flowing through the solenoid or magnet 12 will be sufficient to lift the core 13 against the action of gravity, causing the pile 8 to be more or less compressed by the lever 9. This causes more or less current to be shunted away from the field 6, thereby weakening the fields and tending to decrease the voltage of the generator, so that the charging current is limited to the desired value. In this manner the charging current of the battery is kept substantially constant throughout variations in speed of the generator. When, however, the battery has become substantially charged, as indicated by its rise in voltage, the voltage magnet 15 will become sufficiently energized to raise its core against the action of gravity, whereupon the lever 10 will act to compress the pile 8, and so regulate the voltage of the generator, as to limit the rise in voltage thereof above this desired value. The voltage of the generator being thus limited, the charging current of the battery will immediately slightly decrease, which decrease in current sufficiently weakens the solenoid 12, so that the action of gravity preponderates and the lever 9 is immediately pulled down against the stop 14, and becomes inactive. The regulation of the generator then proceeds purely responsive to voltage control, whereby the voltage of the generator is limited as desired. It will thus be seen that during the charging of the battery, the voltage electroresponsive device 15 remains substantially inactive, and has no effect upon the pile 8 or the regulation of the generator until the battery has become substantially charged, at which time the voltage solenoid 15 assumes control and the current coil becomes inactive. By arranging the levers 9 and 10 to operate on the same end of the pile 8, one end of the pile remains fixed and it is not necessary to provide a pile which is shiftable as a whole.

It will be understood that the usual automatic main switch may be provided for cutting in or connecting the generator with the battery and lamps, when the generator has reached the desired voltage, and that any suitable or well-known form of apparatus may be used for regulating the voltage on the lamps, to keep the lamp voltage at the desired value, irrespective of the changes in voltage across the battery.

The system shown in Fig. 2 is substantially the same as shown in Fig. 1, and operates in substantially the same manner, with the exception that instead of allowing the action of gravity on the cores 13 and 16 to pull the levers 9 and 10 down against the stops 14 and 17 respectively, the levers 9 and 10 are pulled upwardly against the stops 14 and 17, to relieve the pressure on pile 8, by means of springs 20 and 21, respectively. Also, instead of arranging the windings of the solenoid 12 responsive to battery current changes in the battery circuit, the windings 12 are serially connected between the generator and the battery, so as to be responsive to battery current changes by being connected in the main generator circuit, so that coil 12 carries both the battery and lamp current. In either case, however, changes in the battery current affect the solenoid 12, which is serially connected between the generator and battery so that the generator is controlled responsive to battery current changes. In the arrangement shown in Fig. 2, however, the total current is limited to a predetermined value, so that the generator 1 may not be overloaded.

What I claim as new and desire to secure by Letters Patent is:—

1. In an electrical system of distribution, the combination of a generator driven at variable speed, a storage battery connected to be charged thereby, a carbon pile for regulating the voltage of the generator, two members acting on the same end of the pile mechanically independent of one another, an electromagnet controlling the action of one member responsive to voltage changes of the battery and generator, and an electromagnet serially connected between the generator and battery for controlling the action of the other member to regulate the battery charging current.

2. In an electrical system of distribution, the combination of a generator driven at variable speed, a storage battery connected to be charged thereby, a carbon pile for regulating the voltage of the generator, connected in shunt relation with field windings of the generator, a resistance in series with said field windings and pile, two levers acting on the same end of said pile mechanically independent of one another, a solenoid for controlling the lever responsive to voltage changes across the generator and battery and a solenoid serially connected between the generator and battery controlling the other lever, the actuation of either lever by its solenoid tending to compress the pile.

3. In an electrical system of distribution, the combination of a generator driven at variable speed, a storage battery connected to be charged thereby, a carbon pile for regulating the voltage of the generator, two members acting on the same end of the pile mechanically independent of one another, an electromagnet controlling the action of one member responsive to voltage changes of the battery and generator, and an electromagnet controlling the action of the other member responsive to changes in the battery charging current, the voltage controlled electromagnet having no effect on the pile until the battery has become substantially charged.

4. An electrical system of distribution, having in combination a generator, a storage battery connected to be charged thereby, a compressible variable resistance operatively connected in the field circuit to regulate the voltage of the generator, two levers acting on the same end of said compressible variable resistance, mechanically independently of one another, a current coil connected between the generator and battery for regulating the action of one lever, and a coil responsive to voltage changes for regulating the action of the other lever.

5. In an electrical system of distribution, the combination of a generator driven at variable speed, a storage battery connected to be charged thereby, a carbon pile for regulating the voltage of the generator, two members acting on the same end of the pile independent of one another, electroresponsive means for controlling one member responsive to battery current changes during the charging of the battery, so as to limit the charging current and electroresponsive means for controlling the other member responsive to voltage changes, said last mentioned electroresponsive means having no effect on the pile until the battery has become substantially charged, when the generator voltage is controlled purely by voltage changes of the system.

In testimony whereof, I have signed my name to this specification, in the presence of two subscribing witnesses.

GORHAM CROSBY.

Witnesses:
 ADAM SCHMIDT,
 EDWIN SEGER.